United States Patent
Carnevale et al.

(10) Patent No.: US 7,133,943 B2
(45) Date of Patent: Nov. 7, 2006

(54) METHOD AND APPARATUS FOR IMPLEMENTING RECEIVE QUEUE FOR PACKET-BASED COMMUNICATIONS

(75) Inventors: Michael Joseph Carnevale, Rochester, MN (US); Daniel Frank Moertl, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 858 days.

(21) Appl. No.: 10/374,256

(22) Filed: Feb. 26, 2003

(65) Prior Publication Data

US 2004/0167992 A1 Aug. 26, 2004

(51) Int. Cl.
*G06F 3/06* (2006.01)
(52) U.S. Cl. .............................. 710/52; 710/19; 710/56
(58) Field of Classification Search .................. 710/19, 710/52, 56
See application file for complete search history.

(56) References Cited

U.S. PATENT DOCUMENTS

2003/0126336 A1* 7/2003 Creta et al. ................. 710/305
2004/0052250 A1* 3/2004 Hu et al. ..................... 370/389

* cited by examiner

*Primary Examiner*—Kim Huynh
*Assistant Examiner*—Jasjit Vidwan
(74) *Attorney, Agent, or Firm*—Roy W. Truelson

(57) ABSTRACT

A receiver for an InfiniBand network contains a buffer and a control memory. A set of pointers for receive queues in the buffer is maintained in the control memory. Two independent queues exist for incoming messages from a given source, one for writes and the other for reads. The receiver controls the various queue pointers to generate appropriate acknowledgments and negative acknowledgment messages, and to transfer data as required to and from the host over an internal bus. Preferably, the receiver delays acknowledging certain write requests if requests are pending on the read queue. Preferably, the control memory and the major control functions of the receiver are implemented in hardware on a ASIC chip.

17 Claims, 9 Drawing Sheets

METHOD AND APPARATUS FOR IMPLEMENTING RECEIVE QUEUE FOR PACKET-BASED COMMUNICATIONS

RELATED APPLICATIONS

The present application is related to the following commonly assigned copending U.S. patent applications, both of which are herein incorporated by reference:

U.S. patent application Ser. No. 10/360,252, filed Feb. 6, 2003, entitled "METHOD AND APPARATUS FOR IMPLEMENTING GLOBAL TO LOCAL QUEUE PAIR TRANSLATION"; and U.S. patent application Ser. No. 10/359,777 filed Feb. 6, 2003, entitled "METHOD AND APPARATUS FOR IMPLEMENTING INFINIBAND TRANSMIT QUEUE".

FIELD OF THE INVENTION

The present invention relates to digital data processing, and in particular to queues for handling packet-based communications between digital system.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system is an enormously complex machine, usually having many sub-parts or subsystems, each of which may be concurrently performing different functions in a cooperative, although partially autonomous, manner. Typically, the system comprises one or more central processing units (CPUs) which form the heart of the system, and which execute instructions contained in computer programs. Instructions and other data required by the programs executed by the CPUs are stored in memory, which often contains many heterogenous components and is hierarchical in design, containing a base memory or main memory and various caches at one or more levels. At another level, data is also stored in mass storage devices such as rotating disk drives, tape drives, and the like, from which it may be retrieved and loaded into memory. The system also includes hardware necessary to communicate with the outside world, such as input/output controllers; I/O devices attached thereto such as keyboards, monitors, printers, and so forth; and external communication devices for communicating with other digital systems.

Various communications architectures or protocols are available to support communicating data among various components of a computer system. High-speed wide parallel buses are typically used to transmit data between memory and the CPUs. One or more separate I/O buses, such as a well-known Peripheral Component Interface (PCI) bus, may be used to communicate with storage and other peripheral devices and adapters. Other types of I/O network connections may be used for peripheral or other devices which are somewhat more remote. In order to keep pace with the ever increasing needs of data transfer and number and variety of peripheral or remote devices, new and improved communications architectures have been introduced.

One new type of I/O network is known and referred to as the InfiniBand network. InfiniBand is a packet-switched, narrow parallel network connection with zero or more routers, operating at a high data rate. InfiniBand has a greater physical range than a conventional PCI bus, and thus may be used to reach peripheral devices located more remotely (i.e., outside a cabinet in which the computer system is housed). A host channel adapter (HCA) couples the processor to a subnet, and target channel adapters (TCAs) couple the peripherals to the subnet. The subnet typically includes at least one switch, and links that connect the HCA and the TCAs to the switches (although it is possible to have a subnet containing only a link, and no switches). For example, a simple InfiniBand network may have one switch, to which the HCA and the TCAs connect through links. Topologies that are more complex are also possible.

InfiniBand networks can interconnect with local or wide area communication networks. For instance, an Ethernet network adapter can be installed that enables communication over an Ethernet network, which is a common type of communication network. The network adapter has its own TCA for coupling to the InfiniBand network. The InfiniBand specification provides a raw datagram mode of communication to bridge packets received from an Ethernet network for transmission over an InfiniBand network, and vice-versa. Similarly, InfiniBand networks may include routers or adapters to connect to the Internet.

InfiniBand networks provide for communication between TCAs and HCAs in a variety of different manners. In the InfiniBand network, data flows between end nodes on logical connections known as Queue Pairs (QPs) across a switched point-to-point fabric. A typical InfiniBand network may support multiple concurrent queue pair logical connections from a single physical network adapter, enabling a single device to communicate with multiple devices coupled to the network. Like other types of networks, InfiniBand networks have a physical layer, a link layer, a network layer, a transport layer, and upper-level protocols. As in other types of packet-switching networks, in InfiniBand networks particular transactions are divided into messages, which themselves are divided into packets for delivery over an InfiniBand network. When received by the intended recipient, the packets are reordered into the constituent messages of a given transaction. InfiniBand networks provide for queues and channels at which the packets are received and sent.

In order to support a range of different transport services, InfiniBand networks allow connections classified as reliable or unreliable, datagrams classified as reliable or unreliable, and raw packet support. In unreliable connections and datagrams, acknowledgments are not generated, and packet ordering is not guaranteed.

Reliable InfiniBand connections and datagrams have greater restrictions imposed on the message protocol. Packets are sent having sequence numbers in a sequential order. When receiving data on a reliable connection or datagram, the receiver should acknowledge packets received. The receiver should also detect any missing packets and report the error back to the sender, as well as detect and respond to duplicate packets. When missing packets are detected, the receiver continues to process and acknowledge packets received up to the missing packet.

Implementation of the various requirements of an InfiniBand receiver typically requires significant complexity in design. A need exists for a simple and effective receiver mechanism for receiving data on an InfiniBand or similar network, particularly on a reliable connection or datagram of an InfiniBand network, which implements the various requirements of the network in a straightforward manner. More specifically, a purely hardware implementation which can easily accommodate the high transmission rates of InfiniBand data is desirable.

SUMMARY OF THE INVENTION

A receiver for a packet-switched network, which is preferably a reliable connection of an InfiniBand network, contains a memory buffer and a control memory (called a "queue pair context memory") having state information. A set of queue pointers which establish receive queues in the memory buffer is maintained in the queue pair context memory. Two independent queues are established for incoming messages from a given source, one for writes and the other for reads. The receiver controls the various queue pointers to generate appropriate acknowledgments and negative acknowledgment messages, and to transfer data as required to and from the host system over an internal bus.

In the preferred embodiment, the receiver delays acknowledging certain write requests if any requests are pending on the read queue. An acknowledgment of a read request also acknowledges any previous write requests in the sequence of messages. Thus, certain write requests do not cause separate acknowledgments to be generated, thus reducing the amount of traffic on the network.

In the preferred embodiment, the queue pair context memory and the major control functions of the receiver are implemented in hardware on a single application specific integrated circuit (ASIC) chip. The buffer memory is contained on one or more separate memory modules.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
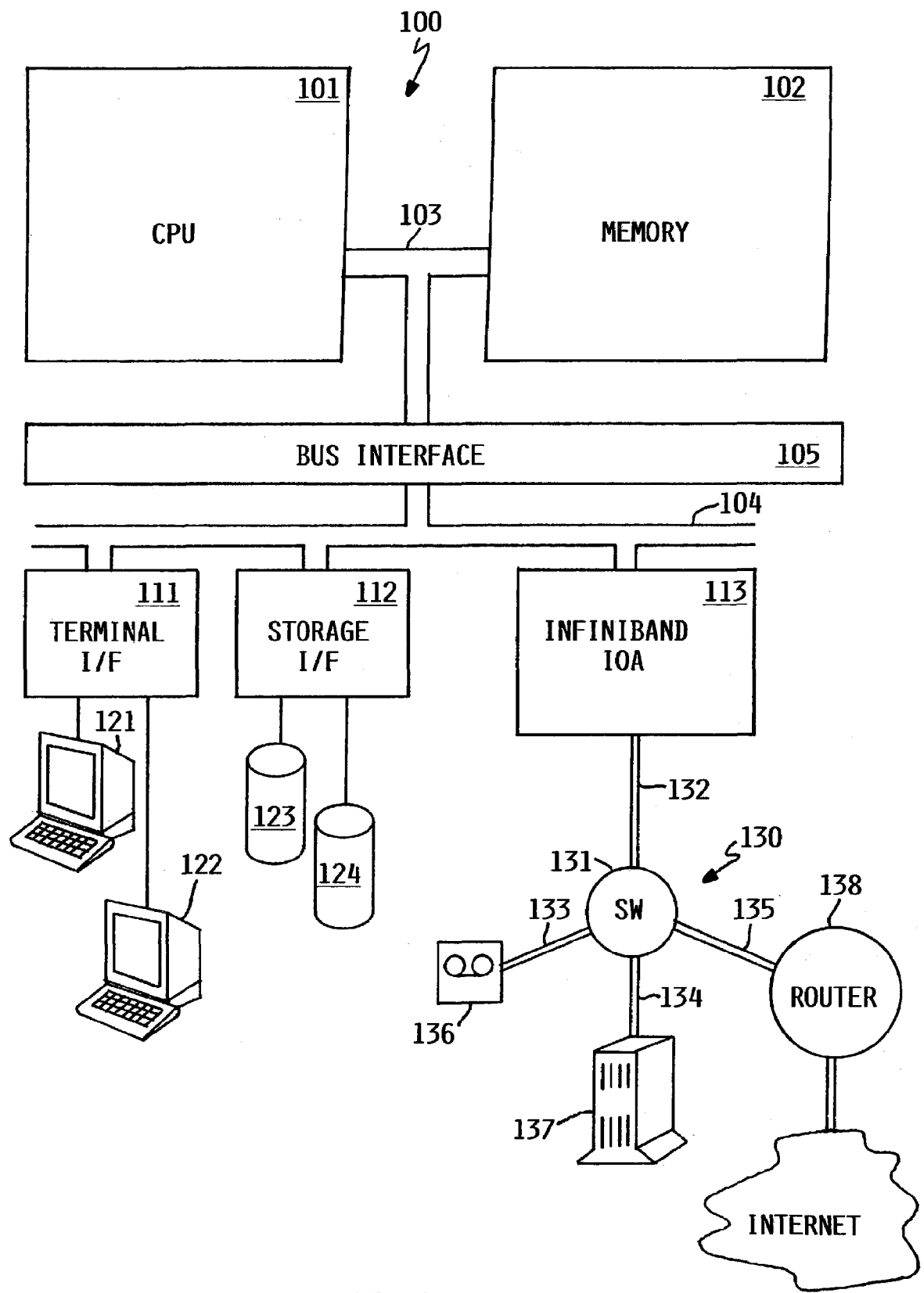
FIG. 1 is a high-level block diagram of the major hardware components of a computer system utilizing an InfiniBand network connection, according to the preferred embodiment of the present invention.

Referring to the Drawing, wherein like numbers denote like parts throughout the several views, FIG. 1 is a high-level representation of the major hardware components of a computer system 100 utilizing an InfiniBand network connection for communicating with various digital devices, according to the preferred embodiment of the present invention. CPU 101 is a general-purpose programmable processor which executes instructions and processes data from main memory 102. Main memory 102 is preferably a random access memory using any of various memory technologies, in which data is loaded from storage or otherwise for processing by CPU 101.

Memory bus 103 provides a data communication path for transferring data among CPU 101, main memory 102 and I/O bus interface unit 105. I/O bus interface 105 is further coupled to system I/O bus 104 for transferring data to and from various I/O units. I/O bus interface 105 communicates with multiple I/O interface units 111–113, which are also known as I/O processors (IOPs) or I/O adapters (IOAs), through system I/O bus 104. System I/O bus may be, e.g., an industry standard PCI bus, or any other appropriate bus technology. The I/O interface units support communication with a variety of storage and I/O devices. For example, terminal interface unit 111 supports the attachment of one or more user terminals 121–122. Storage interface unit 112 supports the attachment of one or more direct access storage devices (DASD) 123–124 (which are typically rotating magnetic disk drive storage devices, although they could alternatively be other devices, including arrays of disk drives configured to appear as a single large storage device to a host). Various other types of I/O devices (not shown) could be attached to I/O interface units, such as tape drives, printers, fax machines, network transceivers, etc.

In particular, one of the I/O interface units is an InfiniBand I/O adapter unit 113. The InfiniBand I/O adapter 113 supports a connection to an InfiniBand network 130. The InfiniBand network comprises switch 131 and multiple point-to-point connections 132–135. The InfiniBand network is a local network which may be used to connect to a variety of digital devices. For example, the InfiniBand network may connect to any of various I/O devices, such as tape drive 136. The InfiniBand network may also connect to other computer systems, such as system 137. The InfiniBand network may also connect to routers or adapters, which in turn couple the InfiniBand network to other local or wide area networks; in the exemplary embodiment of FIG. 1, router 138 connects to the Internet. The various components of computer system 100 apart from InfiniBand I/O adapter 113 and the associated InfiniBand network 130 are sometimes referred to herein as the "host", to distinguish the main part of the system from the operation of the InfiniBand I/O adapter 113.

Although InfiniBand network 130 is shown in FIG. 1 having a single switch 131 and four connections 132–135 to respective digital devices, it will be understood that an InfiniBand network may have a different number of switches, routers and connections (and may have no switches or routers), that the topology of an InfiniBand network may be considerably different and more complex, and that a different number or types of devices may be coupled to an InfiniBand network. It should further be understood that the present invention is not necessarily limited to the use of InfiniBand networks, and might be used with other packet-switched networks having similar characteristics.

It should be understood that FIG. 1 is intended to depict the representative major components of system 100 at a high level, that individual components may have greater complexity that represented in FIG. 1, that components other than or in addition to those shown in FIG. 1 may be present, and that the number, type and configuration of such components may vary. Several particular examples of such additional complexity or additional variations are disclosed herein, it being understood that these are by way of example only and are not necessarily the only such variations.

Although only a single CPU 101 is shown for illustrative purposes in FIG. 1, computer system 100 may contain multiple CPUs, as is known in the art. Although main memory 102 is shown in FIG. 1 as a single monolithic entity, memory 102 may in fact be distributed and/or hierarchical, as is known in the art. E.g., memory may exist in multiple levels of caches, and these caches may be further divided by function, so that one cache holds instructions while another holds non-instruction data which is used by the processor or processors. Memory may further be distributed and associated with different CPUs or sets of CPUs, as is known in any of various so-called non-uniform memory access (NUMA) computer architectures. Although memory bus 103 is shown in FIG. 1 as a relatively simple, single bus structure providing a direct communication path among CPU 101, main memory 102 and I/O bus interface 105, in fact memory bus 103 may comprise multiple different buses or communication paths, which may be arranged in any of various forms, such as point-to-point links in hierarchical, star or web configurations, multiple hierarchical buses, parallel and redundant paths, etc. Furthermore, while I/O bus interface 105 and I/O bus 104 are shown as single respective units, system 100 may in fact contain multiple I/O bus interface units 105 and/or multiple I/O buses 104. While multiple I/O interface units are shown which separate a system I/O bus 104 from various communications paths running to the various I/O devices, it would alternatively be possible to connect some or all of the I/O devices directly to one or more system I/O buses.

Computer system 100 depicted in FIG. 1 has multiple attached terminals 121–122, such as might be typical of a multi-user "mainframe" computer system. Typically, in such a case the actual number of attached devices is greater than those shown in FIG. 1, although the present invention is not limited to systems of any particular size. Computer system 100 may alternatively be a single-user system, typically containing only a single user display and keyboard input.

While various system components have been described and shown at a high level, it should be understood that a typical computer system contains many other components not shown, which are not essential to an understanding of the present invention.

Figure 2:
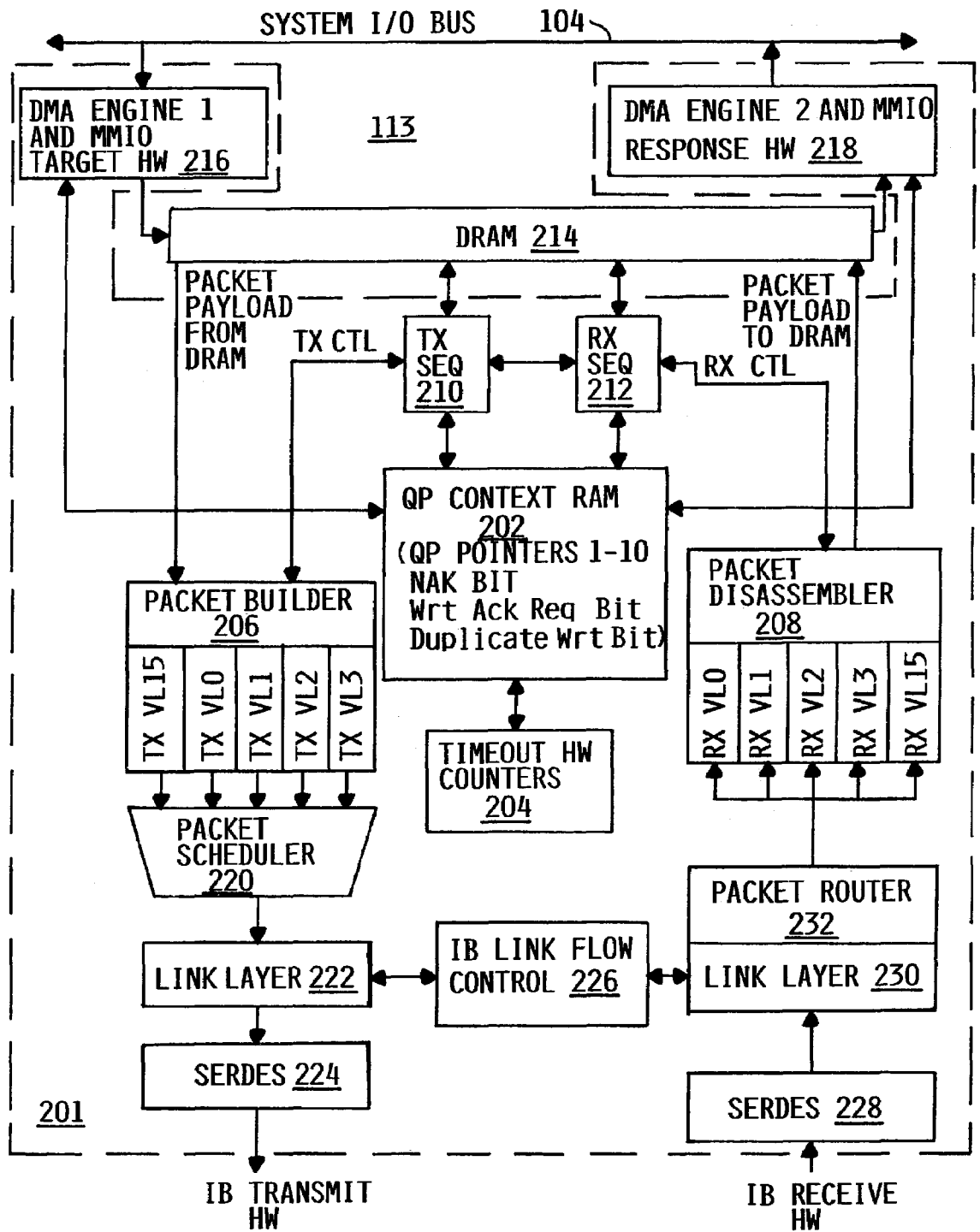
FIG. 2 is a block diagram of an InfiniBand I/O adapter which couples a computer system bus to an InfiniBand network, according to the preferred embodiment.

FIG. 2 is a block diagram showing the major constituent components of InfiniBand I/O adapter 113, which couples computer system I/O bus 104 to InfiniBand network 130, according to the preferred embodiment. In the preferred embodiment, I/O adapter 113 is constructed as a single electronic circuit card assembly which plugs into a connector for for bus 104. Among the component on the card assembly is an ASIC 201 containing the major functional control circuits described herein, and a separate buffer memory implemented as a dynamic random access memory (DRAM) chip or chips 214. The components of the ASIC are shown within the dashed outline of FIG. 2.

Referring to FIG. 2, ASIC 201 of InfiniBand I/O adapter 113 comprises a queue pair (QP) context random access memory (RAM) 202 connected to timeout hardware (HW) counters 204, a packet builder 206 and a packet disassembler 208. QP context RAM 202 stores a set of queue pointers for each queue pair (QP). QP Context RAM 202 for each QP includes a set of QP context RAM pointers, a next packet sequence number, a NAK bit, a Duplicate Wrt bit, and a Wrt Ack Req bit, for operation of the receive queue as described more fully herein. The QP context RAM 202 for each QP further includes pointers and status information for operation of the transmit queue. In the preferred embodiment, up to 64 queue pairs are supported, each requiring 256 bytes of space in QP context RAM 202 for storage of pointers and other status information.

Figure 3:
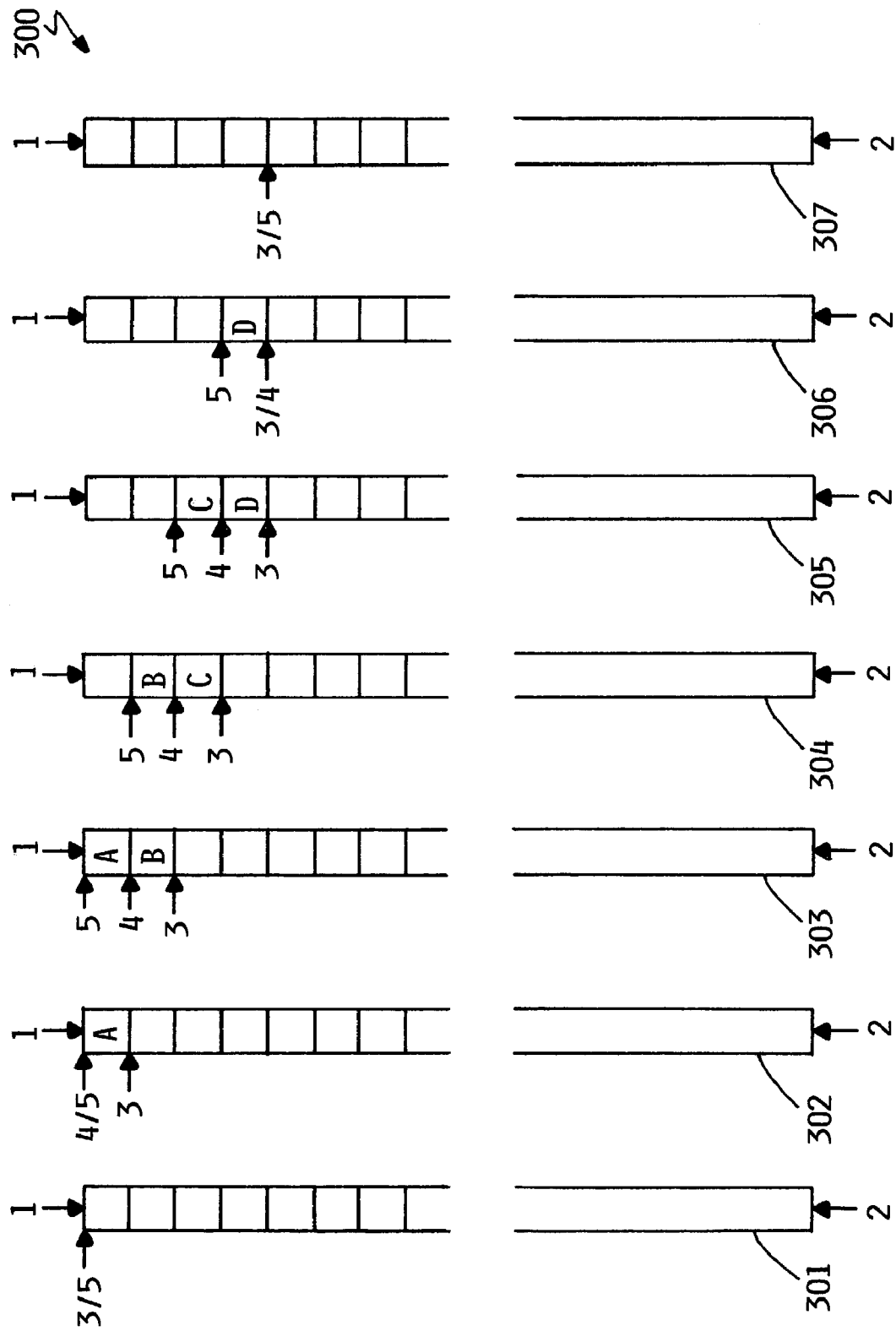
FIG. 3 illustrates the operation of a write queue portion of the receive queue of an InfiniBand I/O adapter over an exemplary period of time, in accordance with the preferred embodiment.
Figure 4:
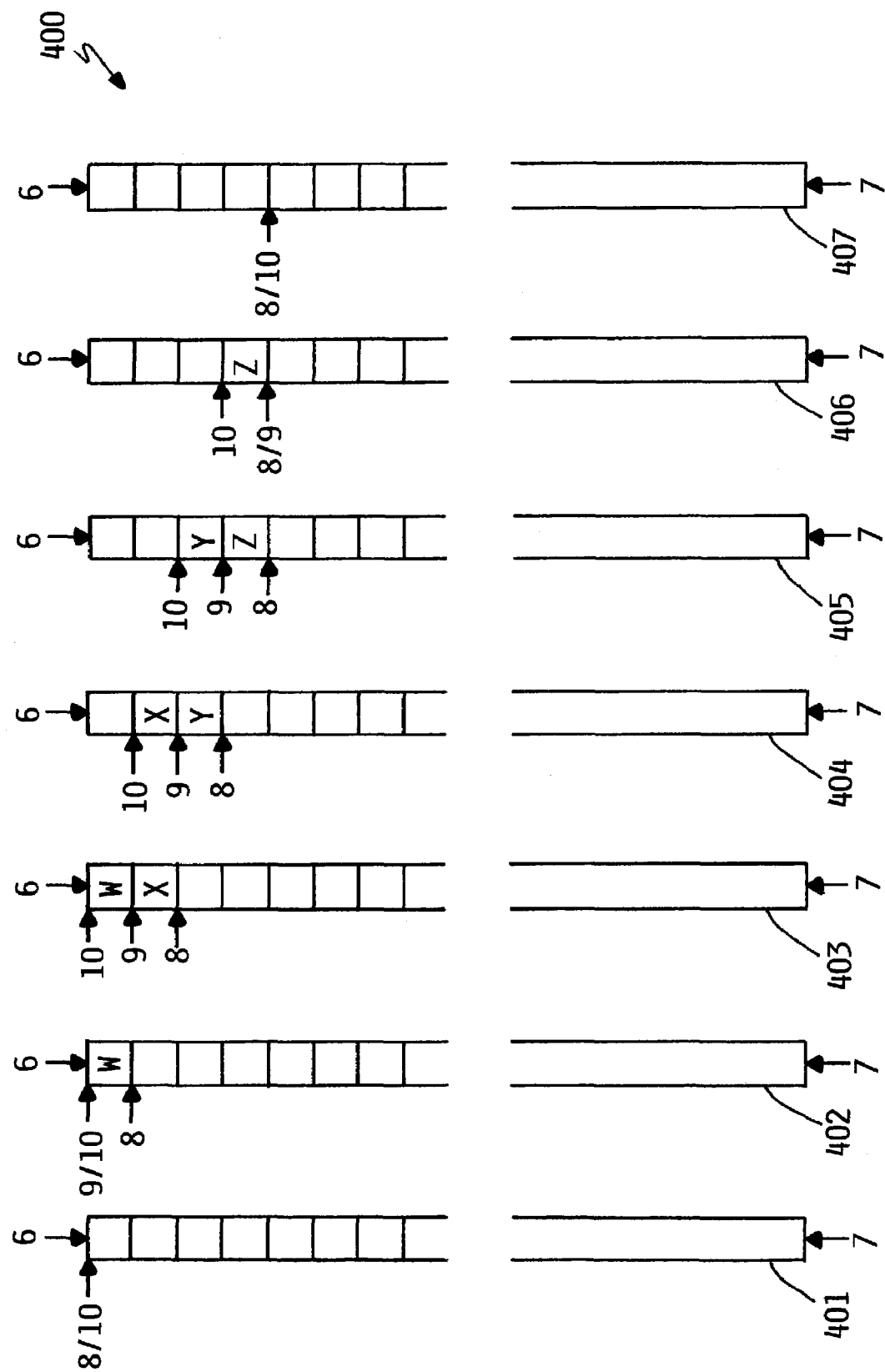
FIG. 4 illustrates the operation of a read queue portion of the receive queue of an InfiniBand I/O adapter over an exemplary period of time, in accordance with the preferred embodiment.

QP context RAM pointers used to control an InfiniBand receive queue according to the preferred embodiment are illustrated and described with respect to FIGS. 3 and 4. InfiniBand I/O adapter 113 includes a transmit sequencer 210 coupled to the QP context RAM 202 and to the packet builder 206. A receive sequencer 212 is coupled to the local QP context RAM 202 and to the packet disassembler 208. A DRAM 214 for storing packet payload data and queue data is coupled to the transmit sequencer 210, the receive sequencer 212, the packet builder 206, and the packet disassembler 208. InfiniBand I/O adapter 113 further includes a first direct memory access (DMA) engine and memory mapped I/O (MMIO) target HW 216 and a second DMA engine and MMIO response HW 218 coupled to system I/O bus 104 and DRAM 214. Messages are received from and passed to a host operating system (OS) and payload data is transferred to and from DRAM 214 and host system components via the system I/O bus 104. First DMA engine and MMIO target HW 216 and second DMA engine and MMIO target HW 218 are coupled to the QP context RAM 202. MMIO target HW 216 allows the host OS to write to registers and RAM in ASIC 201. MMIO response HW 218 allows the host OS to read registers and RAM in ASIC 201.

Packet builder 206 is coupled to InfiniBand (IB) transmit hardware of InfiniBand network 130 via a packet scheduler 220, a link layer 222, and a serializer-deserializer (SERDES) 224. Packet payload data is transferred from DRAM 214 to packet builder 206. An IB link flow control 226 is coupled to link layer 222. Packet disassembler 208 is coupled to IB receive hardware of InfiniBand network 130 via a SERDES 228, a link layer 230, and a packet router 232. IB link flow control 226 is further coupled to link layer 230. Packet payload data is transferred from packet disassembler 208 to DRAM 214. As shown in FIG. 2, packet builder 206 includes a plurality of transmit (TX) virtual lanes (VLs) and packet disassembler 208 includes a plurality of receive (RX) VLs for multiple queue pairs (QPs).

The operation of the transmit related hardware is described in greater detail in commonly assigned copending U.S. patent application Ser. No. 10/359,777 filed Feb. 6, 2003, entitled "METHOD AND APPARATUS FOR IMPLEMENTING INFINIBAND TRANSMIT QUEUE", herein incorporated by reference.

Although various components shown in FIG. 2 are preferably implemented in a single ASIC chip 201 and the buffer memory is preferably a separate DRAM chip or chips 214, it will be understood that an I/O adapter in accordance with the present invention might have some other structural form, and in particular, that it may be possible to implement all functions on a single chip, or that some functions might be implemented on separate components, that some functional components depicted in FIG. 2 might be combined, and that other components not illustrated might be present. It will further be understood that the buffer memory might be implemented as some form of memory other than a DRAM.

In accordance with the preferred embodiment of the present invention, an InfiniBand (IB) receive queue and associated functional components are provided that support compliance with InfiniBand requirements, and particularly InfiniBand requirements for a reliable connection, in an efficient, effective and straightforward manner. The InfiniBand architecture contemplates that, in the case of a reliable type connection, the requester (sender of a request) attaches a sequence number to each packet. The responder (receiver of a request) is required to acknowledge the packets in the order they are received, but is not necessarily required to acknowledge each packet individually (i.e., in some circumstances, acknowledgments may be combined, or "coalesced"). Packets received by a responder may generally be classified as either read requests (in which data is to be sent from the responder to the requester) or write requests (in which data is being sent from the requester to the responder). There are two types of write request: "RDMA writes" and "sends". For purposes of the description herein, both are regarded generically as forms of write request, and receive the same treatment on the write request queue. Each read request requires a response with the data being requested, and this response constitutes the acknowledgment of the request. Each write request needs to be acknowledged, but does not need to be acknowledged separately. A response to a read request, or an acknowledgment of a write request, can acknowledge a previous write request. Additionally certain write requests will may explicitly request acknowledgment, in which case acknowledgment should occur before a timeout condition. In the case that a duplicate request packet is received, the requester must respond appropriately. This means that, in the case of a read, the data requested is re-transmitted to the requester. In the case of a write, the responder is not required to write the data to the host system a second time, but must acknowledge the duplicate write request. Additionally, a responder is required to identify any break or discontinuity in the sequence of packets received. Such an error condition requires that a negative acknowledgment (NAK) be returned to the requester, which will prompt the requester to re-transmit all packets from the NAK sequence number. However, all packets in the sequence before the NAK must be processed normally by the responder, and the NAK must not be transmitted to the requester out of sequence.

In accordance with the preferred embodiment, a receive queue in the responder enables the requirements for an InfiniBand reliable connection to be supported. The receive queue is divided into two substantially independent queues, one for read requests and the other for write requests. Various pointers in the QP context RAM maintain status separately for each of the read and write queues. If an error condition requiring a NAK is detected, a corresponding entry is added to the read queue, and thus the NAK is, in some ways, treated as a read request, although no data is required to be obtained from the host system. In general, acknowledgments are generated from the read queue when a response is ready to be transmitted, and acknowledgments from the write queue are deferred as long as read responses are pending. If the read queue is empty and there are entries in the write queue, an acknowledgment may be generated from the write queue.

FIGS. 3 and 4 illustrate the operation of the receive queue, according to the preferred embodiment. The receive queue utilizes two independent queues, referred to herein as the write queue portion and the read queue portion, for handling write and read type messages, respectively. FIG. 3 illustrates the operation of write queue portion 300 over an exemplary period of time, in accordance with the preferred embodiment. FIG. 4 illustrates the operation of read queue portion 400 over an exemplary period of time, in accordance with the preferred embodiment.

Both queue portions are implemented as circular FIFO queues, in which the queue data is stored in DRAM 214 and pointers to various queue locations in the DRAM for control purposes are maintained in QP context RAM 202. Queue depth is programmable by altering certain queue pointers. It should be understood that there is one receive queue and one set of pointers and status data for each queue pair, and that multiple queue pairs are supported. The pointers are defined as follows:

Pointer 1: Top Rx Wrt Pointer. Pointer to the start of write queue portion 300.

Pointer 2: Bottom Rx Wrt Pointer. Pointer to the end or wrap boundary of write queue portion 300.

Pointer 3: Rx Wrt Current Pointer. Pointer to the end of the write/send message that was just received.

Pointer 4: Host Rx Wrt DMA Pointer. Pointer to the next entry that may need to DMA data from DRAM 214 to the Host application via system I/O bus 104.

Pointer 5: Rx Wrt Done Pointer. Pointer to the next entry that is waiting to send a message to the Host application indicating a received write request operation has completed.

Pointer 6: Top Rx Read Pointer. Pointer to the start of read queue portion 400.

Pointer 7: Bottom Rx Read Pointer. Pointer to the end or wrap boundary of read queue portion 400.

Pointer 8: Rx Read Current Pointer. Pointer to the end of the read message request that was just received or the NAK condition that the receive hardware has just detected.

Pointer 9: Host Rx Read DMA Pointer. Pointer to the next entry that may need to DMA data from the Host application to DRAM 214 via system I/O bus 104.

Pointer 10: Rx Read Ack Pointer. Pointer to entry from which IB read response packets are being generated.

Referring to FIG. 3, seven queue states 301–307 are represented, each state representing write queue 300 at a successive moment in time as four write-type messages (write or send) are received from a requester and processed. In all states, pointer 1 (Top Rx Wrt Pointer) points to the beginning of the space allocated for the write queue, and pointer 2 (Bottom Rx Wrt Pointer) points to the end of the write queue; these pointers do not change as individual messages are received and processed, and would only change if the queue depth is reconfigured. In state 301, the write queue is empty, and pointers 3–5 point to the same location. In response to receiving write message "A" from the requester, packet disassembler 208 processes the request and builds a command block containing the write data, placing this block on the write queue in DRAM 214. State 302 shows the state of the write queue after write message "A" has been received and entered on the queue, causing pointer 3 (Rx Current Wrt Pointer) to be advanced to the next block in the queue (referred to herein as "incremented"). When pointer 3 is ahead of pointer 4 (Host RX Wrt DMA Pointer) in the queue (indicated as pointer 3>pointer 4, it being understood that ">" is merely a convenient notation, and that the queue being circular, the actual address might be greater than or less than), DMA engine 218 is started, causing data from write message A to be transferred using a direct memory access operation (DMAed) into host memory via system I/O bus 104. When this DMA transfer is complete, pointer 4 is incremented. State 303 represents the write queue after a message "B" has been received from the requester (causing pointer 3 to be incremented again) and message "A" has been DMAed into the host (causing pointer 4 to be incremented). With pointer 4>pointer 5 (Rx Wrt Done Pointer), DMA engine 218 sends a message to the host indicating that the data transfer is complete, and pointer 5 is then incremented. State 304 represents the write queue after a message "C" has been received from the requester (causing pointer 3 to be incremented again), message "B" has been DMAed into the host (causing pointer 4 to be incremented again), and message "A" has completed and the host been notified (causing pointer 5 to be incremented). State 305 represents the write queue after a message "D" has been received from the requester (causing pointer 3 to be incremented again), message "C" has been DMAed into the host (causing pointer 4 to be incremented again), and message "B" has completed and the host been notified (causing pointer 5 to be incremented again). State 306 represents the write queue after message "D" has been DMAed into the host (causing pointer 4 to be incremented again), and message "C" has completed and the host been notified (causing pointer 5 to be incremented again); during the interval between state 305 and 306, no new write messages are received, and pointers 3 and 4 now point to the same location. State 307 represents the write queue after message "D" has completed and the host been notified (causing pointer 5 to be incremented again); at this point, pointers 3–5 all point to the same location, indicating that the queue is again empty.

Referring to FIG. 4, seven queue states 401–407 are represented, each state representing read queue 400 at a successive moment in time as four read messages are received from a requester and processed. In all states, pointer 6 (Top Rx Read Pointer) points to the beginning of the space allocated for the read queue, and pointer 7 (Bottom Rx Read Pointer) points to the end of the read queue; these pointers do not change as individual messages are received and processed, and would only change if the queue depth is reconfigured. In state 401, the read queue is empty, and pointers 8–10 point to the same location. In response to receiving read request message "W" from the requester, packet disassembler 208 processes the request and builds a command block containing the read request, placing this block on the read queue in DRAM 214. State 402 shows the state of the read queue after read message "W" has been received and entered on the queue, causing pointer 8 (Rx Current Read Pointer) to be incremented. When pointer 8>pointer 9 (Host Rx Read DMA Pointer), DMA engine 216 is started, causing data requested in read message W to be transferred using a direct memory access operation (DMAed) from host memory into DRAM 214 via system I/O bus 104. When this DMA transfer is complete, pointer 9 is incremented. State 403 represents the read queue after a message "X" has been received from the requester (causing pointer 8 to be incremented again) and the data requested in message "W" has been DMAed from the host into DRAM 214 (causing pointer 9 to be incremented). With pointer 9>pointer 10 (Rx Read Ack Pointer), packet builder 206 builds and outgoing message (an Acknowledgment of the original read), and this is sent to the requester; pointer 10 is then incremented. State 404 represents the read queue after a message "Y" has been received from the requester (causing pointer 8 to be incremented again), data requested in message "X" has been DMAed from the host into the DRAM (causing pointer 9 to be incremented again), and data requested in message "W" has been transmitted (Ack) to the requester (causing pointer 10 to be incremented). State 405 represents the read queue after a message "Z" has been received from the requester (causing pointer 8 to be incremented again), data requested in message "Y" has been DMAed from the host into the DRAM (causing pointer 9 to be incremented again), and data requested in message "X" has been transmitted (Ack) to the requester (causing pointer 10 to be incremented again). State 406 represents the read queue after data requested in message "Z" has been DMAed into the DRAM (causing pointer 9 to be incremented again), and data requested in message "Y" has been transmitted to the requester (causing pointer 10 to be incremented again); during the interval between state 405 and 406, no new read messages are received, and pointers 8 and 9 now point to the same location. State 407 represents the read queue after data requested in message "Z" has been transmitted to the requester (causing pointer 10 to be incremented again); at this point, pointers 8–10 all point to the same location, indicating that the queue is again empty.

When a packet is received (either read or write), packet disassembler 208 increments a next packet sequence number in QP context RAM 202, enabling it to detect out-of-sequence and duplicate packets. If a duplicate write request is detected, no entry is made in queue 300, but instead a Duplicate Wrt bit in QP context RAM is set, causing an Ack to be generated. A duplicate read request is treated in the same manner as any other read request, since it must be assumed that the requester did not receive the data. It is also possible that a write request will contain a specific acknowledge request (an AckReq bit in the packet header is set on), in which case a Wrt Ack Req bit in QP context RAM 202 is set, causing an Ack to be generated. If some error condition is detected (e.g, a packet sequence error), the packet disassembler places a NAK entry on read queue 400. The purpose of the NAK entry is to cause a NAK (Negative Acknowledge) to be returned to the requester in the proper sequence of messages. On the read queue, a NAK behaves similarly to other read messages, except that, there being no data to DMA from the host, pointer 9 is incremented almost immediately after incrementing pointer 8. The NAK will be sent to the requester after all previous read request messages have been properly responded to (Acknowledged).

The operation of various control hardware components is shown in greater detail in FIGS. 5–8. FIGS. 5–8 represent the operation of these hardware components as flow diagrams for illustrative purposes. However, it will be understood that, control being in hardware, control structures do not necessarily correspond identically to the flow diagram illustrations, and that in particular, greater parallelism is typical in hardware implementations. It should further be understood that, for clarity of illustration, the flow diagrams represent control with respect to the receive queue and requests from a single requester, and that if multiple requesters are making requests concurrently, each such requester would have a separate receive queue which is controlled separately.

Figure 5A:
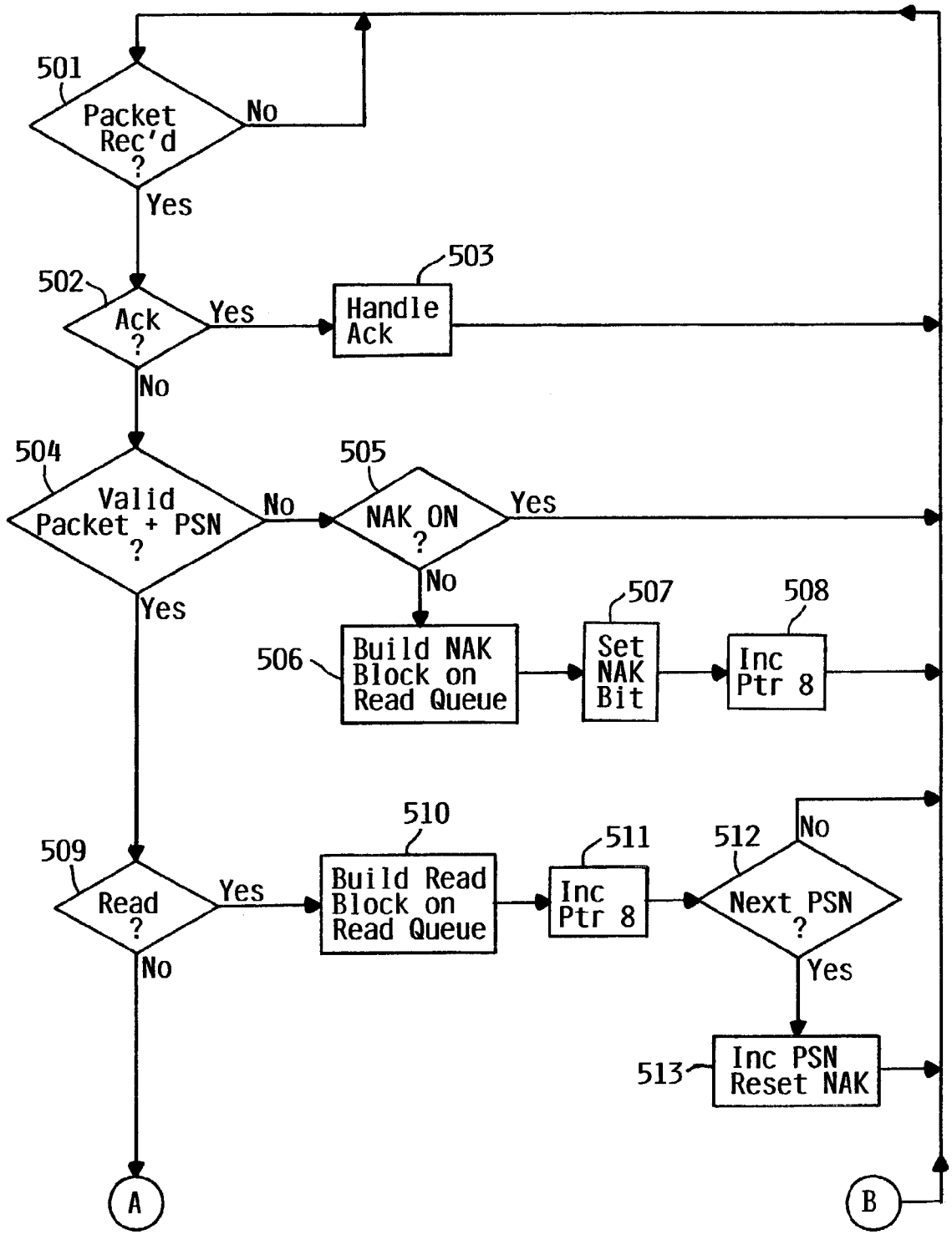
FIGS. 5A and 5B (herein collectively referred to as FIG. 5) together are a flow diagram showing the operation of a packet disassembler of an InfiniBand I/O adapter, according to the preferred embodiment.
Figure 5B:
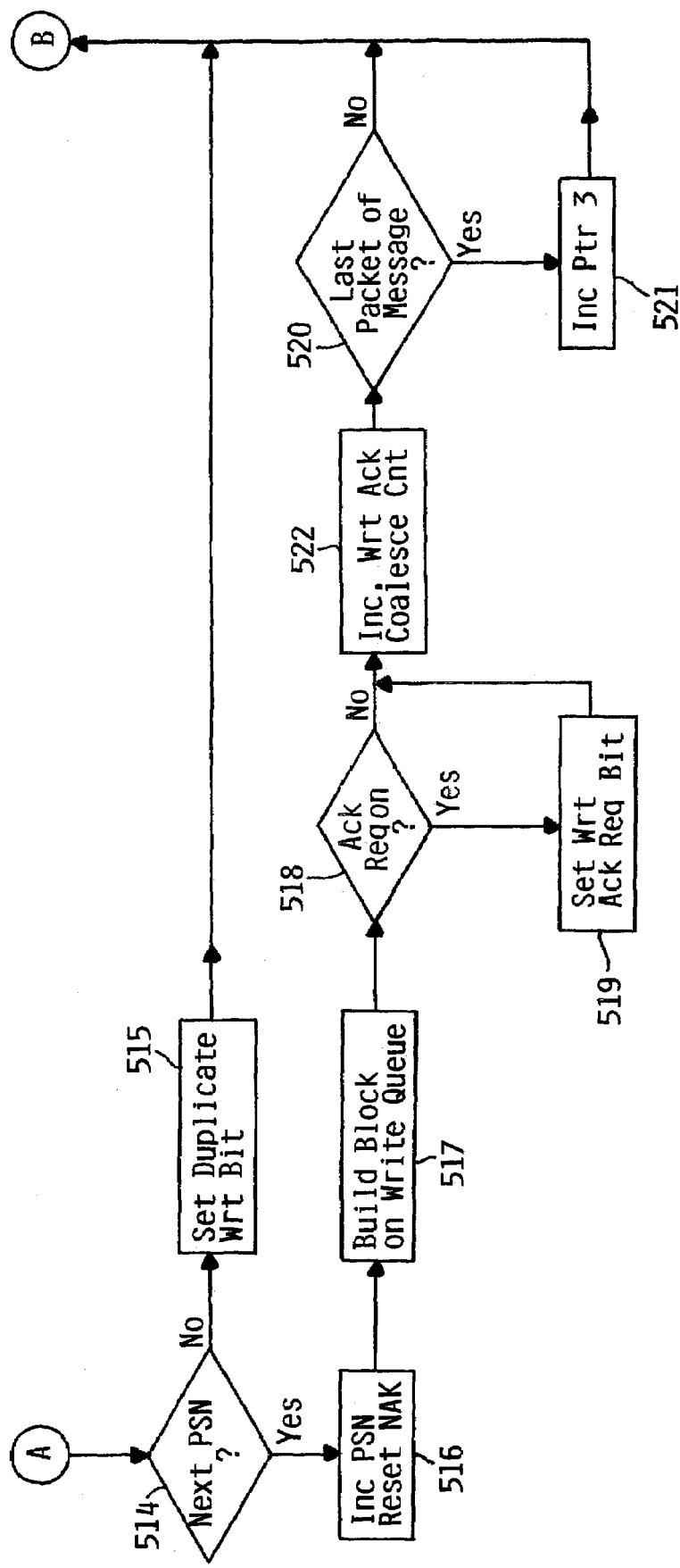

FIG. 5 is a flow diagram showing the operation of packet disassembler 208, according to the preferred embodiment. Packet disassembler receives packets over the network through SERDES 228, link layer 230, and packet router 232, and generates blocks in the various queues in DRAM 214 for action by other hardware. Referring to FIG. 5, the packet disassembler idles waiting for a packet (step 501). When a packet is received, the packet disassembler determines whether it is an Acknowledge packet, i.e., whether it is a response to a request previously sent by InfiniBand I/O adapter 113 (step 502). If so, it handles the Acknowledge packet appropriately (step 503). The operation of the packet disassembler in handling Acknowledge packets is described in greater detail in a copending patent application, and steps 502 and 503 are included here only for completeness. Packet disassembler 208 verifies that the received packet complies with all architectural requirements and that the packet sequence number of the packet is valid (step 504). If the packet or sequence number is invalid or some other error condition is detected, the "N" branch is taken from step 504, and the packet disassembler determines whether the NAK bit for the corresponding queue pair in QP context RAM 202 is set on (step 505). If the NAK bit is on, an invalid packet has already been received and a NAK entry made in the read queue. In this case, there is no need to put a second NAK on the read queue, and so the packet is ignored ("Y" branch from step 505). If the NAK bit is not set, the packet disassembler builds a NAK block on the read queue 400 (step 506), which will eventually cause a NAK to be sent to the requester. It then sets the NAK bit in QP context RAM 202 (step 507), and increments pointer 8 to signal other control hardware that an entry has been added to the read queue (step 508).

If the received packet passes the validity check at step 504 (the "Y" branch from step 504), packet disassembler 208 determines whether the packet is a read message (step 509). If so, the packet disassembler builds a read block on read queue 400 (step 510), and increments pointer 8 (step 511). If the packet sequence number (PSN) of the received packet is the next expected PSN in the sequence (step 512), then the expected PSN in QP context RAM is incremented and the NAK bit is reset (step 513). If the PSN of the received packet is not the next number in the sequence, the packet is a duplicate of a previously received read request packet, and step 513 is by-passed (the "N" branch from step 512).

If the received packet was not a read request packet (the "N" branch from step 509), it was a write-request-type packet. In this case, packet disassembler checks whether the PSN of the packet is the next PSN in the sequence (step 514). If not, the packet is a duplicate of a previously received write request packet. In this case, a Duplicate Wrt bit in QP context RAM 202 is set (step 515) to cause an acknowledge to be sent, but there is no further processing of the duplicate write, and it is not added to the write queue. If the PSN of the packet is the next number in the sequence, the expected PSN in QP context RAM is incremented and the NAK bit is reset (step 516). The packet disassembler builds a write block on write queue 300 (step 517). If the AckReq bit in the header of the received packet was on (step 518), the requester is asking for an acknowledgment of the write packet. In this case, a Wrt Ack Req bit in QP context RAM 202 is set (step 519); otherwise step 519 is by-passed. The Wrt Ack Coalesce counter is incremented (step 522). If the packet received was the last packet of a write message (step 520), pointer 3 is then incremented (step 521), signaling to the control hardware that there is data on the write queue ready for further processing.

Figure 6:
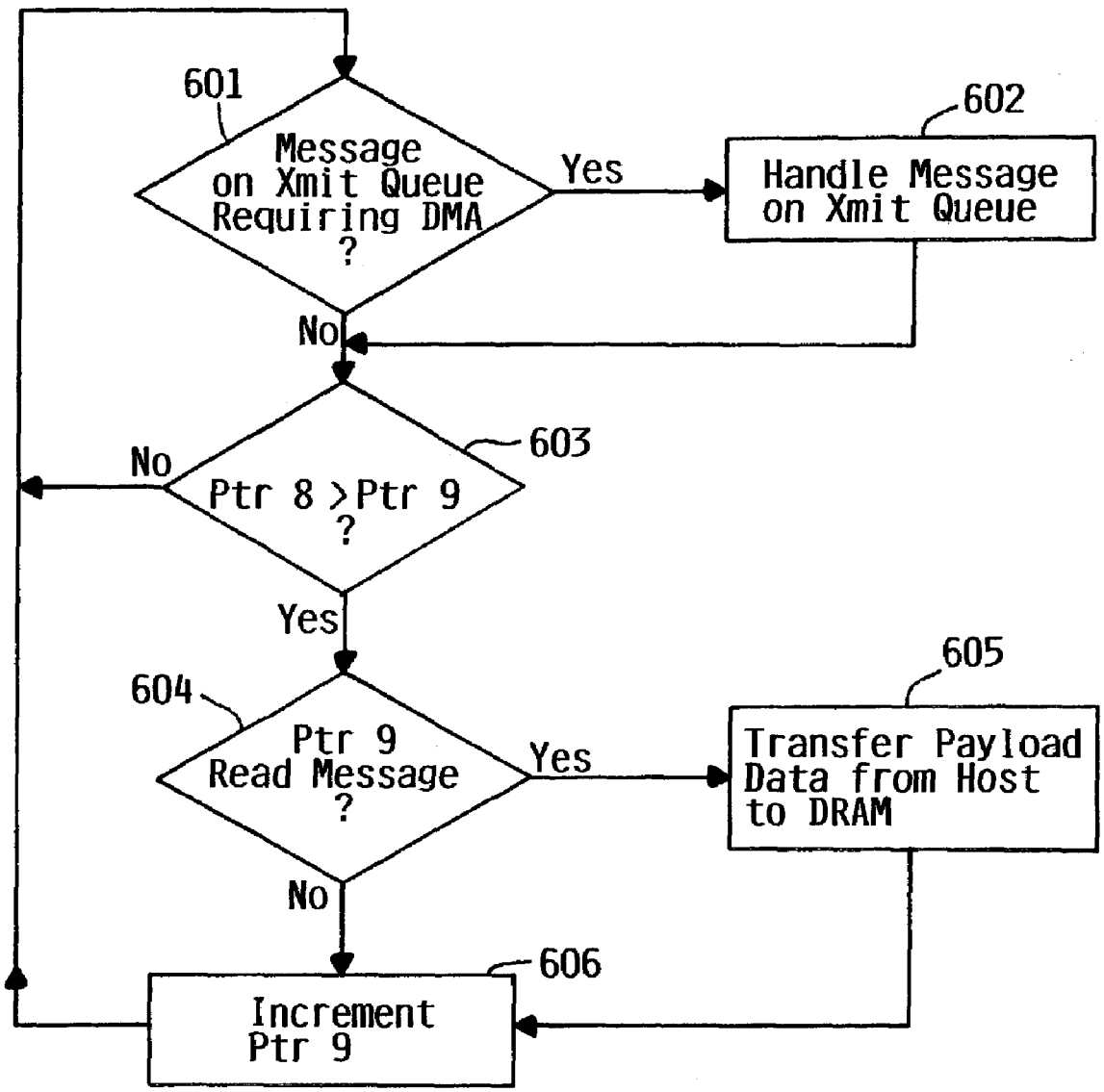
FIG. 6 is a flow diagram showing the operation of a first DMA engine for downloading data from a host to an InfiniBand I/O adapter, according to the preferred embodiment.

FIG. 6 is a flow diagram showing the operation of first DMA engine 216, according to the preferred embodiment. First DMA engine 216 polls the various pointers is QP context RAM 202 to detect conditions which require action. Referring to FIG. 6, the first DMA engine determines whether there is a message on a transmit queue requiring a DMA download of data from the host (step 601), and if so, handles the message on the transmit queue appropriately (step 602). The operation of the transmit queue is described in greater detail in a copending patent application, and steps 601 and 602 are included here only for completeness. First DMA engine 216 determines whether pointer 8 is greater than pointer 9 for any of the queue pairs (step 603). If not, there is no message command block in a read queue awaiting download of data, and the "N" branch is taken to return to step 601. If pointer 8 is greater than pointer 9, DMA engine 216 determines whether the message is a read message requiring download of data from the host (step 604). If so, the DMA engine is started and the requested payload data is transferred from the host to DRAM 214 in a DMA operation (step 605). When the DMA operation is complete (or if a DMA operation is not required), pointer 9 is incremented (step 606). Generally, a DMA operation (step 605) will be required for read messages, but not for NAK blocks on the read queue.

Figure 7:
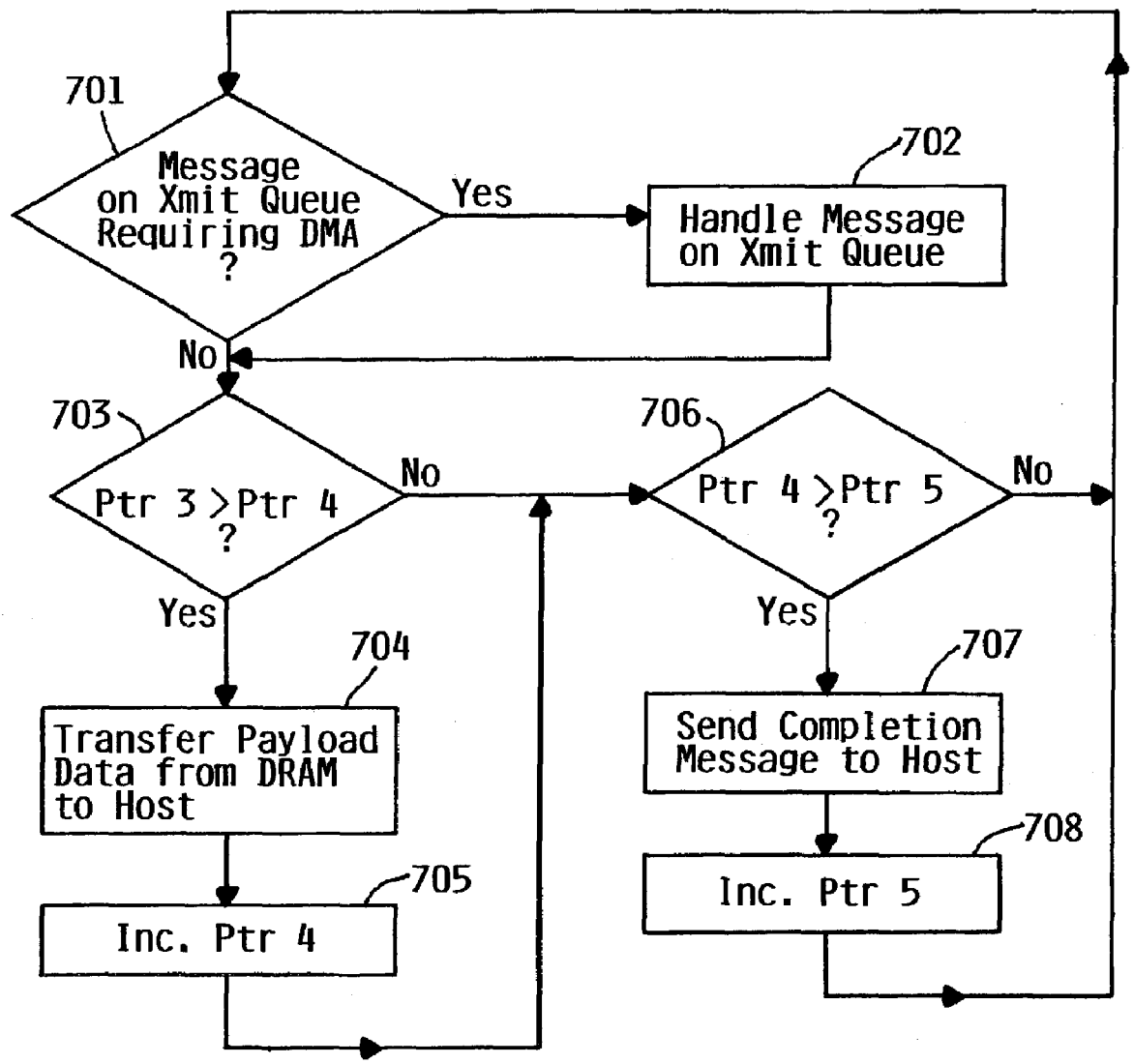
FIG. 7 is a flow diagram showing the operation of a second DMA engine for uploading data from an InfiniBand I/O adapter to a host, according to the preferred embodiment.

FIG. 7 is a flow diagram showing the operation of second DMA engine 218, according to the preferred embodiment. Second DMA engine 218 also polls the various pointers is QP context RAM 202 to detect conditions which require action. Referring to FIG. 7, the second DMA engine determines whether there is a message on a transmit queue requiring a DMA upload of data from DRAM 214 to the host (step 701), and if so, handles the message on the transmit queue appropriately (step 702). The operation of the transmit queue is described in greater detail in a copending patent application, and steps 701 and 702 are included here only for completeness. Second DMA engine 218 determines whether pointer 3 is greater than pointer 4 for any of the queue pairs (step 703). If not, there is no message command block in a write queue awaiting upload of data to the host, and the "N" branch is taken to step 706. If pointer 3 is greater than pointer 4, DMA engine 218 is started and the write payload data is transferred from DRAM 214 to the host in a DMA operation (step 704). When the DMA operation is complete, pointer 4 is incremented (step 705). The DMA engine also checks whether pointer 4 is greater than pointer 5 (step 706). If so, a DMA upload operation has completed and a completion message needs is sent to the host (step 707), and pointer 5 is then incremented (step 708).

Figure 8:
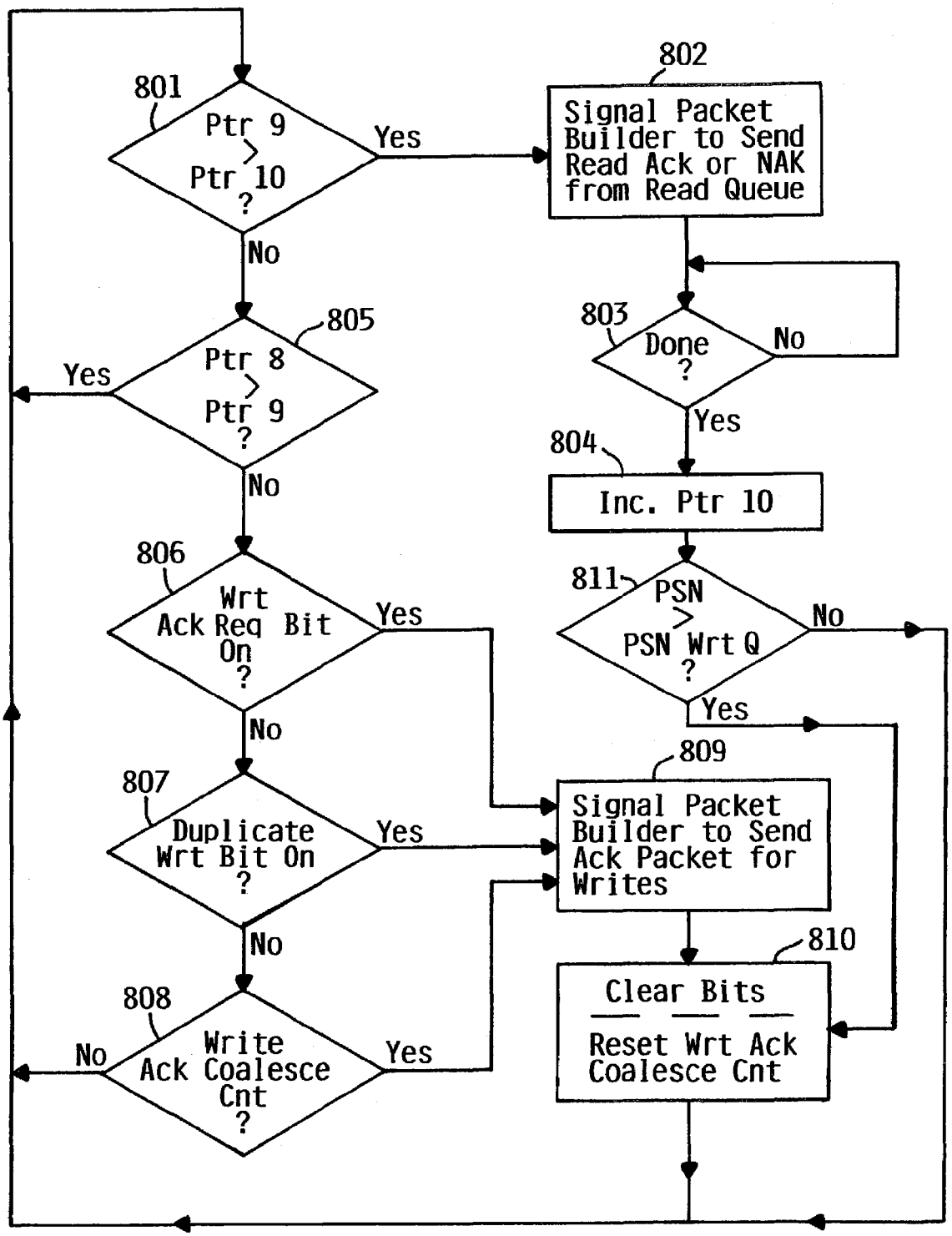
FIG. 8 is a flow diagram showing the operation of Receive Queue Sequencer hardware for an InfiniBand I/O adapter, according to the preferred embodiment.

FIG. 8 is a flow diagram showing the operation of receive queue sequencer 212, according to the preferred embodiment. If pointer 9 is greater than pointer 10 (step 801), there is a read or NAK command in the read queue ready to be sent out. In this case, receive queue sequencer 212 signals packet builder 206 to construct and send an appropriate message to the requester (step 802). In the case of a read request, this is a response, containing the data that was DMAed from the host into DRAM 214. In the case of a NAK entry on the read queue, packet builder 206 constructs the corresponding NAK packet. Sequencer 212 waits for the packet to be sent (step 803), and then increments pointer 10 (step 804) to indicate that the read queue entry has been completed. The response (Ack) has the effect of acknowledging all writes that were received in the sequence of incoming packets from the same requestor prior to the request that is being acknowledged. Sequencer 212 therefore compares the packet sequence number of the read request just acknowledged with the most recent write request from the same requestor on write queue 300 (step 811). If the PSN of the read request is greater than the PSN of any write request on queue 300, then all write requests on the queue have been acknowledged. In this case, the "Y" branch is taken from step 811, and the sequencer also clears the Wrt Ack Req bit, the Duplicate Wrt bit, and resets the Wrt Ack Coalesce counter (step 810), as explained below. If the PSN of the read request is not greater than the PSN of some write request, step 810 is by-passed.

If pointer 9 is not greater than pointer 10, there is nothing waiting to send on the read queue. Sequencer 212 checks whether pointer 8 is greater than pointer 9 (step 805). If so, then there is a command block on the read queue which is waiting for data to download from the host. In this case, the sequencer will simply wait until the data has downloaded, causing pointer 9 to be incremented, so that pointer 9 will be greater than pointer 10, as represented by the "Y" branch from step 805. If pointer 8 is not greater than pointer 9, then the read queue is empty. In this case, the sequencer checks control information to determine whether to send an Ack for write request packets received. If the Wrt Ack Req bit is on (step 806) or the Duplicate Wrt bit is on (step 807) or a Wrt Ack Coalesce count has been reached (step 808) then sequencer 212 signals packet builder 206 to send an Ack packet for the writes that have been received. The Ack simply acknowledges all write packets up to the current packet sequence number. The sequencer then clears the Wrt Ack Req bit, the Duplicate Wrt bit, and resets the Wrt Ack Coalesce counter (step 810). The Wrt Ack Coalesce counter is a hardware counter which counts write packets received and not acknowledged, and is used to impose a limit on the number of outstanding unacknowledged write packets.

Although the InfiniBand I/O adapter implementation described herein has been described as a purely hardware implementation, it will be understood that it would alternatively be possible to implement some or all of the control functions described herein in software executing on a programmable processor.

Although a specific embodiment of the invention has been disclosed along with certain alternatives, it will be recognized by those skilled in the art that additional variations in form and detail may be made within the scope of the following claims:

What is claimed is:

1. An I/O adapter for a packet-switched network, comprising:
    a buffer memory;
    a packet disassembler receiving request packets from a requester over said network and building blocks from said packets in queues in said buffer memory, said request packets including packets of a first type requesting that data be sent to the requester and packets of a second type containing data sent by the requester;
    wherein said packet disassembler places blocks from packets of said first type in a first queue and blocks from packets of said second type in a second queue;
    wherein said packet disassembler detects an out-of-sequence packet and, responsive thereto, builds a negative acknowledge (NAK) block in said first queue;
    a control memory for containing state data, said state data including a plurality of queue pointers, said queue pointers pointing to locations in said first and second queues;
    a receive queue sequencer, said receive queue sequencer determining when to send acknowledgment packets to said requester from said state data in said control memory, wherein packets are acknowledged in the order received; and
    a packet builder which builds and sends acknowledge packets responsive to said receive queue sequencer.

2. The I/O adapter for a packet-switched network of claim 1, wherein said packet-switched network is an InfiniBand network.

3. The I/O adapter for a packet-switched network of claim 1, wherein said packet disassembler, said control memory, said receive queue sequencer, and said packet builder are implemented on a single application specific integrated circuit (ASIC) chip.

4. The I/O adapter for a packet-switched network of claim 3, wherein said buffer memory is implemented in at least one memory chip separate from said application specific integrated circuit (ASIC) chip.

5. The I/O adapter for a packet-switched network of claim 1, further comprising:
    at least one DMA engine for transferring data between said buffer memory and a host system to which said I/O adapter is attached.

6. The I/O adapter for a packet-switched network of claim 5,
    wherein said state data comprises a first pointer indicating an end of a most recently received block on said first queue, a second pointer indicating a next block on said first queue to transfer data from said host to said buffer memory using said at least one DMA engine, a third pointer indicating an end of a most recently received block on said second queue, and a fourth pointer indicating a next block on said second queue to transfer data to said host using said at least one DMA engine; and
    wherein said at least one DMA engine initiates transfer of data from said host to said buffer memory when said first pointer is ahead of said second pointer, and said at least one DMA engine initiates transfer of data from said buffer memory to said host when said third pointer is ahead of said fourth pointer.

7. The I/O adapter for a packet-switched network of claim 1, wherein acknowledgments for at least some packets of said second type are coalesced with acknowledgments for other packets.

8. The I/O adapter for a packet-switched network of claim 7, wherein said receive queue sequencer does not acknowledge blocks from said second queue if there are any unacknowledged blocks on said first queue.

9. The I/O adapter for a packet-switched network of claim 8, wherein said receive queue sequencer acknowledges blocks from said second queue if there are no unacknowledged blocks on said first queue and at least one state condition is present from the set of state conditions consisting of:
    (a) a write acknowledge coalesce count has been reached;
    (b) an unacknowledged duplicate write request has been received; and
    (c) an unacknowledged write request including an explicit request for acknowledgment has been received.

10. The I/O adapter for a packet-switched network of claim 1, wherein said buffer memory includes a plurality of first queues and a plurality of second queues, each queue of said plurality of first queues corresponding to a respective requester of a plurality of requesters, and each queue of said plurality of second queues corresponding to a respective requester of said plurality of requesters.

11. A method of interfacing with a packet-switched network, comprising the steps of:
    receiving request packets from a requester over said network and building blocks from said packets in queues in a buffer memory, said request packets including packets of a first type requesting that data be sent to the requester and packets of a second type containing data sent by the requester;

placing blocks form packets of said first type in a first queue in said buffer memory and blocks from packets of said second type in a second queue in said buffer memory;

detecting out-of-sequence packets and, responsive thereto, building negative acknowledgment (NAK) blocks in said first queue;

maintaining state data for said first and second queues;

determining when to send acknowledgment packets to said requester from said state data, wherein packets are acknowledged in the order received, and wherein acknowledgments for at least some packets of said second type are coalesced with acknowledgments for other packets; and building and sending acknowledge packets responsive to said step of determining when to send acknowledgment packets.

12. The method of interfacing with a packet-switched network of claim 11, wherein said packet-switched network is an InfiniBand network.

13. The method of interfacing with a packet-switched network of claim 11, wherein said method steps are executed by an I/O adapter device attached to an I/O bus of a host computer system, said buffer memory being contained in said I/O adapter device.

14. The method of interfacing with a packet-switched network of claim 13, wherein said I/O adapter device supports DMA transfer of data between said buffer memory and said host computer system;

wherein said state data comprises a first pointer indicating an end of a most recently received block on said first queue, a second pointer indicating a next block on said first queue to DMA transfer data from said host computer system to said buffer memory, a third pointer indicating an end of a most recently received block on said second queue, and a fourth pointer indicating a next block on said second queue to DMA transfer data from said buffer memory to said host; computer system; and wherein DMA transfer of data from said host computer system to said buffer memory is initiated when said first pointer is ahead of said second pointer, and wherein DMA transfer of data from said buffer memory to said host computer system when said third pointer is ahead of said fourth pointer.

15. The method of interfacing with a packet-switched network of claim 11, wherein said blocks from said second queue are not acknowledged if there are any unacknowledged blocks on said first queue.

16. The method of interfacing with a packet-switched network of claim 15, wherein said blocks from said second queue are acknowledged if there are no unacknowledged blocks on said first queue and at least one state condition is present from the set of state conditions consisting of:

(a) a write acknowledge coalesce count has been reached;

(b) an unacknowledged duplicate write request has been received; and (c) an unacknowledged write request including an explicit request for acknowledgment has been received.

17. The method of interface with a packet-switched network of claim 11, wherein said buffer memory includes a plurality of first queues and a plurality of second queues, each queue of said plurality of first queues corresponding to a respective requester of a plurality of requesters, and each queue of said plurality of second queues corresponding to a respective requester of said plurality of requesters.

* * * * *